United States Patent Office 2,768,503
Patented Oct. 30, 1956

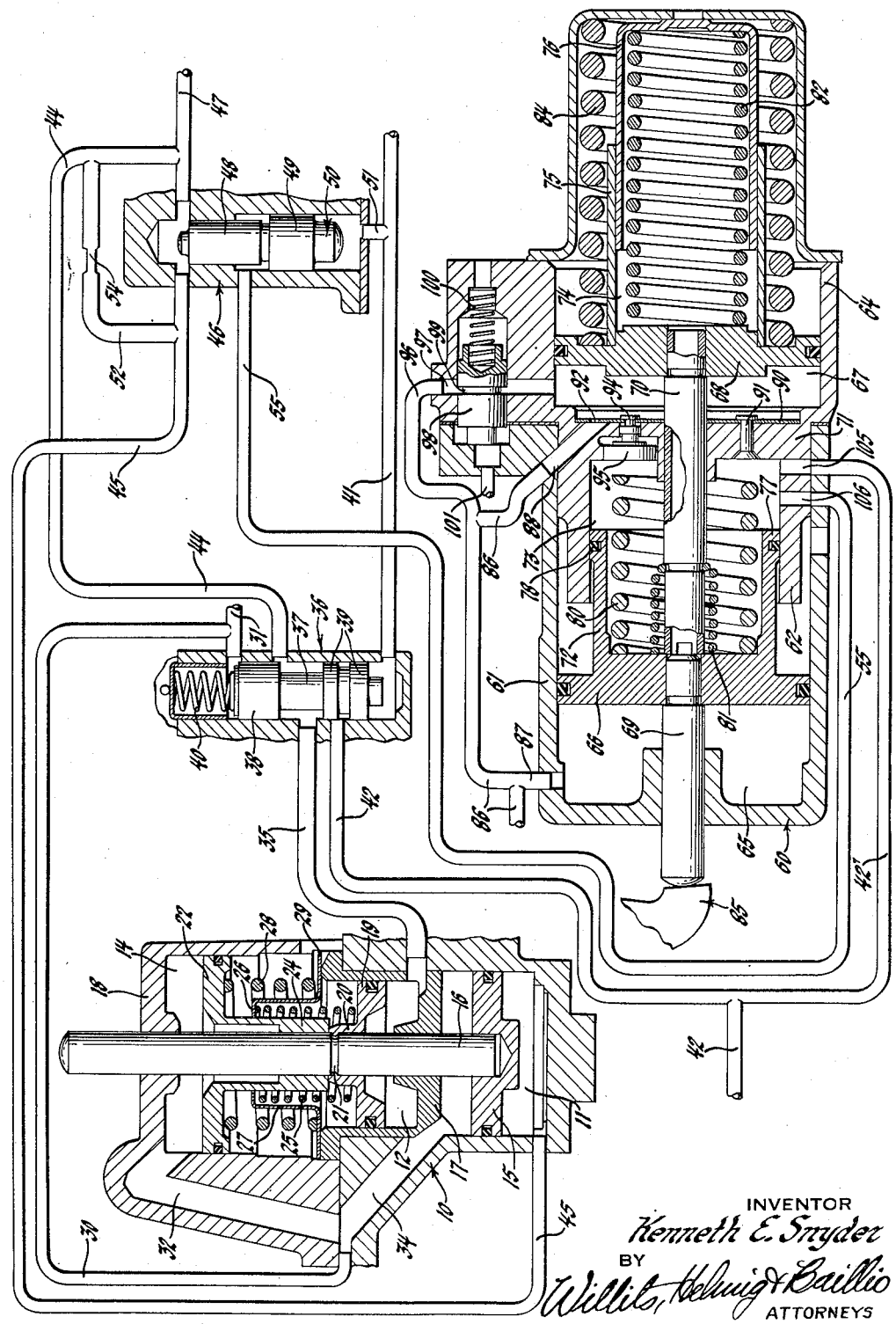

2,768,503

CONTROLS FOR SERVO MECHANISMS

Kenneth E. Snyder, Northville, Mich., assignor to General Motors Corporation, Detroit, Mich., a corporation of Delaware Application December 30, 1952, Serial No. 328,725

14 Claims. (Cl. 60—97)

This invention relates to controls for servo mechanisms particularly adapted for use in hydraulically operated automatic transmissions.

The present invention constitutes an improvement over similar controls for mechanisms shown and described in the co-pending applications of Walter B. Herndon, S. N. 235,213, filed July 5, 1951, for Transmission Control System which application is now abandoned and S. N. 295,519, filed June 25, 1952, for Transmission Control System, and my co-pending application S. N. 323,964, filed December 4, 1952, for Servo Mechanisms and Associated Valving which is now Patent No. 2,720,190, issued October 11, 1955, and the principal object of the invention is to improve the operating characteristics of devices of this type. As described in these applications, the transmissions thereof can be operated in a number of ranges and, consequently, the selector mechanism can be operated to select any one of a number of conditions. These conditions are, Neutral; Driving Range 4, which indicates that the mechanism can be operated in four forward speeds; Driving Range 3, which indicates that the mechanism can be operated normally only in the first three speeds; Low, which indicates that the mechanism can be operated only in first and second speeds; and Reverse.

In transmissions of the type shown and described in the above-mentioned applications, use has been made of two forward drive planetary gear units and a reverse planetary gear unit, the forward drive units having a fluid coupling interposed therebetween. Each of the forward drive units has one element thereof provided with a drum about which a brake band can be so applied as to restrain the drum and the element from rotation. Each unit also includes a clutch for locking two of the elements of the units together for certain speed ratios.

In order that the brake band can be applied to the drum in such fashion as to lock the same against rotation under all operating conditions requiring such a state, use is made of a servo device to which liquid can be supplied for developing the force necessary for the application of the band. The mechanism with which the controls of this invention function is constructed particularly for use in connection with the application and release of the brake band incorporated in the first or front drive planetary unit of the transmission disclosed in the said applications. In this transmission the front planetary unit is operated in reduction drive for first and third forward speeds and for reverse, and in direct drive for second and fourth forward speeds. The second or rear planetary unit is operated in reduction drive for first and third forward speeds and for in direct drive for third and fourth forward speeds. In order that the unit may operate in reduction drive, it is necessary that the band be applied to lock one of the elements of the unit against rotation, and it is evident that the force required for such locking action may vary as the power being transmitted through the transmission varies. Consequently, the present invention makes provision for so supplying liquid under pressure as to provide the necessary force for holding the band in locking condition with the drum during the variable operating conditions thereof and under the various power transmission conditions prevailing in these operations.

The invention is particularly concerned with the operation of the servo mechanism for the front unit during a forced down-shift from fourth speed to third speed. When the transmission has been operating in fourth speed over any considerable period of time, the clutch plates for the front unit, which are in engagement, have increased adherence so that a longer interval of time is required for their release than is necessary for release when the plates have been in engagement for a shorter period, as in a second to third shift. Consequently, this invention provides for timing the application of the brake band in the front unit in such fashion that the clutch of the front unit has an opportunity to become released at least simultaneously with the application of the brake band. To this end the supply of liquid to apply the front band is delayed or retarded sufficiently for the clutch to become released. However, the timing valve employed for this purpose is rendered inoperative to delay the liquid supply to the front servo during the shift from second speed to third speed.

The features, objects and advantages of the invention will become apparent by referring to the following drawing illustrating the same in diagrammatic fashion.

Referring to the drawing, 10 indicates a servo housing made up of a number of parts so shaped and joined together as to form three chambers, 11, 12 and 14. Slidably mounted in chamber 11 is a piston 15 having secured thereto a piston rod 16 which passes through a partition wall 17 and through the end wall 18 of the housing to extend a suitable distance therebeyond. Slidable within the chamber 12 is a piston 19, the hub 20 of which has a part forced into an annular groove 21 in the piston rod so that the piston 19 must reciprocate with the rod. Slidably mounted within chamber 14 is a piston 22, the hub 24 of which is slidably mounted on the rod 16. A spring 25 surrounds the hubs 20 and 24 and is confined between the upper wall of piston 19 and a step 26 on the member 27. A second spring 28 surrounds the tubular part of member 27 and exerts a force tending to move piston 22 away from member 27.

The casing 10 is provided with a port connected to the oil line 30 which is a branch of supply line 31. The port just mentioned is in communication with a channel 32 extending to the chamber 14 above piston 22 and a channel 34 extending to the portion of chamber 11 above piston 15.

Chamber 12 is provided with a port connected to line 35, which in turn is connected to a port in the body of valve 36 to communicate with the bore thereof. This bore has slidably mounted therein a valve member 37 having a land 38 and spaced lands 39. A spring 40, retained in the upper part of the valve bore, normally forces the valve 37 downwardly to the full extent of its permissible travel. The body of valve 36 has a port therein near the bottom thereof connected to line 41 which acts as a control line. A spaced port in the valve body is connected to supply line 42; a third port is connected to branch line 44; and a fourth port is connected to line 31.

The casing 10 is provided with a port near the bottom thereof and in communication with the portion of chamber 11 below piston 15, which port is connected to a line 45 in turn connected to a port in the body of a valve 46. The same port in this valve body has connected thereto a line 47. The bore in the body 46 is formed in two diameters within which fit parts 48 and 49 of the valve member indicated generally at 50. A port in the bottom of valve body 46 has connected thereto a branch line 51 from the control line 41. A bypass line 52, having a restriction 54 therein, extends from line 44 to line 45. Another liquid line 55 is connected to the bore of valve body 46 above the part 49 of the valve member 50 and extends to the servo for the rear planetary unit for purposes to be explained later.

The servo incorporated in casing 10 is associated with the front or first planetary unit and is of the liquid-applied type well known in this art. It becomes necessary to assist the liquid pressure which is ample for low load operation by the introduction of additional liquid pressure during phases of operation requiring more force. It will be understood, of course, that the piston rod 16 cooperates with the band (not shown) in such manner that movement of the piston rod outwardly, relative to the casing, causes the band to be wrapped around the drum while movement of the piston rod inwardly of the casing releases the band. Spring 25 normally, in the absence of liquid in any of the chambers, holds the rod in its innermost position in which the central extension on piston 15 contacts the bottom wall of the casing 10.

The servo indicated generally at 60 for the rear or second planetary unit is of the spring-applied, liquid-release type. This servo has a casing 61 in one end of which is secured an annular extension 62 of a second two-part casing 64. Casing 61 provides a chamber 65 in which piston 66 is slidably mounted, while casing 64 provides a chamber 67 in which piston 68 is slidably mounted. Piston 66 has secured thereto a rod 69 which extends through the end wall of casing 61, and piston 68 has secured thereto a rod 70 which extends through partition wall 71 of casing 64 into close proximity to the inner end of rod 69 adjacent to piston 66. Rod 70 is hollow throughout its length to afford communication between chamber 73 formed by skirt 72 of piston 66 and extension 62 and chamber 74 formed by skirt 75 attached to piston 68 and cup 76. Skirt 72 has an annular enlargement 77 in close sliding fit with the inner wall of extension 62, and the closeness of this fit is aided by the oil seal 78.

Springs 80, 81, 82 and 84, located as shown, are utilized to bias pistons 66 and 68 in a direction forcing rod 69 outwardly. This rod 69 cooperates with mechanism indicated generally at 85 in such manner that when the rod is in retracted position the brake band of the rear or second planetary unit is released, while outward movement of the rod, relative to the casings, causes this mechanism to apply the brake band.

Liquid under pump pressure to move pistons 66 and 68 against the springs is supplied by line 86, having a branch 87 communicating with chamber 65, and the inclined passage 88 leading to chamber 67. Reed valve 90 is formed in arcuate shape from thin metal and has one end part secured to partition wall 71 by rivet 91, with the other end part extending across the mouth of passage 88. A small orifice 92 in the reed valve is aligned with the passage 88. Button 94 secured to the reed valve is slidable in a bore in wall 71, which bore extends to a counterbore in which plug 95 is slidable. Movement of this plug toward the reed valve will move the button and the valve to force the end of the valve away from the mouth of passage 88.

A bypass line 96 leads from line 86 to a passage 97 across which extends exhaust valve 98 having a peripheral groove 99 intermediate its ends. Spring 100 at one end moves the valve to a position in which groove 99 is in register with passage 97. The opposite end of the bore in which valve 98 slides is connected to a liquid supply line 101.

Passage 105 leading to chamber 73 is connected to supply line 42' which is a branch of line 42, while a spaced passage 106 leading to the same chamber is connected to line 55 extending to valve casing 46.

The operation of these servo mechanisms and the valves 36 and 46 associated therewith will be understood better from the following detailed description thereof. The line 47 is connected to a supply of liquid under substantially constant, or pump pressure, and this line 47 serves to introduce such liquid to the chamber 11 beneath piston 15 via line 45 and also to deliver liquid to the valve casing 36, by way of lines 52 and 44, to be available whenever operating conditions require the use thereof. The valve member 50 in valve casing 46 normally is in downmost position and is moved upwardly only when oil, under a variable pressure determined by the speed of rotation of the output shaft of the transmission, such as by a tail shaft governor, is supplied thereto through the line 41 and the branch 51. The regulation of pressure in line 41, in accordance with speed of rotation of the output shaft of the transmission, is well known since tail shaft governors are employed in many types of automatic transmissions. The line 42 leading to valve casing 36 is connected to a supply of fluid under pressure which varies in accordance with movement of the throttle lever controlling operation of the engine from which power is being transmitted. This type of variable liquid pressure is known to the art as compensator pressure and may range from zero to full pump pressure. The line 31 is connected to a supply of liquid under pressure which becomes available during certain operating conditions to cause release of the band, i. e., when the front unit clutch is being applied, which occurs when the transmission is conditioned for second and fourth speed ratio operation.

Let it be assumed that the transmission is to be operated in first speed ratio. In this ratio the front unit must be in reduction drive and the rear unit likewise must be in reduction drive, in each instance requiring that the respective brake band of the units be applied. At the initiation of operation in this ratio the valve 50 is in its downmost position; the valve 37 is spring-pressed to its downmost position and the piston rod 16, with pistons attached thereto, is also in its downmost position. As soon as selection of first speed ratio has been made, liquid under substantially constant pressure such as pump pressure is immediately supplied through line 47, ports in valve casing 46 and line 45 to the chamber 11 below piston 15, as the result of which this piston is forced upwardly in the casing, moving the piston rod 16 outwardly to apply the band to the drum to lock the same against rotation. Liquid in the branch line 44 is arrested by the land 33 of valve 37 while the liquid under variable or compensator pressure supplied by line 42 may pass from the valve through the line 35 to the chamber 12. Thus, as the torque applied to the transmission is increased, liquid under increasing pressure or compensator pressure is supplied to the chamber 12 and, hence, to piston 19 to add to the force exerted by piston 15 to maintain the band in applied condition. Compensator pressure, therefore, is utilized to augment pressure behind piston 15 during a predetermined range of input torque.

The rear servo 60 for the rear or second planetary unit is also operated to apply the brake band of that unit by the pump pressure supply line 86 being exhausted, which causes the chambers 65 and 67 to be exhausted so that the various springs in the servo are unimpeded in forcing the rod 69 outwardly. During the operation in first speed the action of the springs is augmented by liquid under variable pressure, i. e., pressure regulated by the compensator, which liquid is supplied through the branch line 42' from line 42 to the chamber 73 and thence through the hollow rod 70 into the chamber 74. This liquid acts both on piston 66 and piston 68 to move them in aid of the springs, whereby the rod 69 is moved outwardly to cause the band to grip its complementary surface with sufficient force to lock the planetary element associated therewith against rotation. The rear servo remains in the condition just described during first and second speed operation.

When the transmission is shifted from second speed to third speed conditions, the rear servo must be actuated to release the brake band of that unit while the clutch thereof is engaged. To accomplish this action, liquid under pump pressure is supplied through the line 86 to the chamber 65 through branch 87 and to the chamber 67 through the passage 88. This liquid is under pressure sufficiently high to overcome the resistance of the springs, with the added force applied by the oil under variable compensator pressure, thereby moving the pistons 66 and 68 to cause rod 69 to be retracted.

As the speed of the output shaft and, consequently, of the vehicle increases, the variable pressure exerted in the fluid supplied by line 41, or governor pressure, will increase to such an extent that this liquid, acting on the bottom of valve 37, will move it upwardly against spring 40 until the port connected to line 42 is closed, and the port connected to line 44 is opened, permitting the available liquid in line 44 to be introduced through line 35 to chamber 12. As before stated, the liquid in branch 44 is at a substantially constant or pump pressure, which is the maximum pressure required for aid in holding the band applied about the drum. Thus it will be seen that at speeds of operation above the predetermined range sufficient pressure is supplied to assure proper functioning of the first planetary unit in reduction drive and, under ordinary operation of the transmission, this higher range of speed occurs only when the entire transmission is in third speed ratio.

The before described arrangement whereby liquid under constant pressure is utilized for applying the band is particularly advantageous during the operation of the transmission in Driving Range 3 when the transmission is in third speed. Since third speed is the normal top speed in this range, it follows that when the vehicle is permitted to decelerate with closed throttle so that the engine acts as a brake, considerable force must be exerted to retain the band applied during the braking action. When the engine is driving the mechanism through the first planetary unit, a force is exerted on the braked element tending to turn it in one direction. The band used for braking this element customarily is of the self-energizing type and, hence, a certain force is required to keep it applied. However, when the engine acts as a load, with the former driven element now acting to drive instead of being driven, the force exerted on the braked element tends to turn it in the opposite direction. Consequently, sufficient liquid pressure must be applied through the servo to overcome this overrun condition, thereby to keep the braked element stationary. The arrangement including the valve 36 and the supply line 44 serves admirably for this purpose.

In the shift of the mechanism from first to second in Driving Range 3 and both from first to second and third to fourth in Driving Range 4, the following takes place. It is necessary to engage the clutch between elements of the first unit and simultaneously release the band applied by the rod 16. Consequently, liquid under pressure is supplied simultaneously to the clutch to engage it, and through line 31 to the branch 30, and through passages 32 and 34 to pistons 22 and 15, respectively. Also this liquid is supplied to the top of land 38 of valve 37 to aid the spring 40 in moving the valve 37 downwardly against liquid under governor pressure. Such movement assures that the only liquid introduced into the chamber 12 will be that supplied by the line 42, i. e., liquid under compensator regulation. The liquid acting on pistons 22 and 15 operates on surfaces large enough to assure that these pistons will be moved downwardly to the full permissible extent, carrying the rod along with the pistons to release the band. The piston surfaces (the upper surfaces of pistons 15 and 22) so affected have a total area greater than the surfaces (the lower surfaces of pistons 15 and 19) against which liquid is applied to oppose spring action. Since in the operation of the mechanism liquid is not exhausted from the lower part of chamber 11 and from chamber 12 while the rod 16 is retracted but is retained available under pressure for immediate use, the overall opposing areas (the upper surfaces of pistons 15 and 22) for retracting the rod are provided. The action of valve 37 in this phase of operation assures that the only pressure applied to piston 19 to oppose the springs and releasing pressure in the servo is the variable compensator pressure which ordinarily is less than full pump pressure.

The valve 46 and the bypass 52 with restriction 54 performs a particular function when the mechanism is operating in Driving Range 4 and in fourth speed. In some occasions it is desirable to shift the mechanism from fourth speed to third speed by a full throttle opening. When such occurs the clutch in the front unit must be released, entailing exhausting the liquid from the clutch piston, and the front band must be applied with the two actions in timed relation. As before mentioned, the plates of the front clutch adhere more closely after extended engagement than after brief engagement.

With the mechanism in fourth speed, as just mentioned, the pressure under governor regulation of liquid in line 41 and the branch 51 is sufficient to move the valve 50 upwardly, closing the ports connected to lines 47 and 45. Therefore, when the liquid supplied to release the band through line 31 and branch 30 is exhausted along with liquid to the front clutch, full pressure to apply the band by action on piston 15 can take place only by the liquid from supply line 47 passing through bypass 52 and restriction 54 to the line 45. The restriction 54 insures that full pressure in the lower part of chamber 11 can be developed only after a predetermined interval which can be so determined as to occur exactly as the front clutch is released. In this manner smooth shifting is accomplished.

While the timed action just described is highly desirable for a forced or full throttle shift from fourth speed to third speed, the delay in actuation of the front servo, occasioned by requiring the liquid to pass through restriction 54, is undesirable in other phases of operation of the transmission, particularly during a shift from second speed to third speed. For this reason the line 55, connected to the valve body 46 above the part 49, is extended to be in communication, through passage 106, with the chamber 73. Thus, when oil under compensator regulated variable pressure is introduced into chamber 73 and the rear servo is being operated to apply the rear band, i. e., the position shown in the drawing, this liquid passes from the rear servo to act on the part 49 of valve 50. The upper end of the part 48 of this valve is subjected to the pressure of the liquid in the lines 45 and 47, which pressure is never completely exhausted, as before mentioned. Thus, the areas provided by the upper end of the part 48 and the upper surface of the part 49, with the liquid under full pump pressure acting in the first instance, and the liquid under compensator pressure acting in the second instance, are sufficiently large for the liquid pressures thereon to overbalance the pressure delivered to the lower end of the valve 50 through the branch 51, which pressure is the variable governor or G–1 pressure. It follows that so long as the rear servo is maintained in band-applied position the valve 50 cannot be forced upwardly to interrupt the flow of liquid from line 47 to line 45 and thence to the chamber 11 of the front servo.

With this arrangement, when a shift is made from second to third speed, which requires the release of the clutch in the front unit and the application of the brake band thereof with attendant release of the band of the rear unit and engagement of the clutch thereof, the crisp action of the servo in applying the front band is assured since the supply of liquid for that purpose is not impeded.

Pressure of liquid delivered to the chamber 65 will eventually move piston 66 to the right (as viewed in the drawing) until the enlargement 77 has moved beyond the passage 106, cutting off supply of liquid from chamber 73 to the line 55. At the same time, this line becomes exhausted since it is connected through the passage 106 to the space between extension 62 and skirt 72 of piston 66 and thence through the opening in the casing 61 adjacent to passage 106. Consequently, after the full second to third shift has been accomplished, the variable pressure is removed from the top of the part 49 of valve 50 so that governor or G-1 pressure is free to oppose only line pressure acting on the top of the valve and ultimately can move this valve upwardly to block the passage from line 47 to line 45. It will be clear, therefore, that the restricted passage forms the only path for liquid travel to chamber 11 of the front servo only when a complete shift to third speed has been accomplished and during fourth speed operation which, as before stated, requires the rear servo to be in band-release condition.

The reed valve 90, having the restriction 92 therein, is so mounted that it can move a slight distance away from the partition wall 71 when liquid is being supplied through the channel 88. When this valve rests against the partition wall, liquid being exhausted through the channel 88 under some circumstances must pass through restriction 92 thereby retarding the exhaust of chamber 67. This exhaust of the chamber 67 can be accelerated either by movement of the plug 95 under the action of liquid under compensator regulated pressure in chamber 73, which will move the button 94 and hence the valve 90 away from chamber 88, or through the passage 97 controlled by valve 98. Valve 98 is normally held in position opening passage 97 by the spring 100, but can be moved to close this passage at a predetermined time during operation of the transmission. It is particularly contemplated that such closure of the valve will take place when liquid is supplied to various parts of the transmisison for the purpose of effecting a shift from first speed ratio to second speed ratio. Once the valve has been closed in this manner, it remains closed during further acceleration or progressive up-shifting of the mechanism and during down-shifting thereof for the express purpose of necessitating exhaust of chamber 67 through the restriction 92 during a down-shift from third speed to second speed or from third speed to first speed. Either of the latter shifts entails the release of the clutch of the rear planetary unit timed with the application of the brake band of this unit, and it is desirable that the clutch be given an opportunity to become released simultaneously with the application of the brake band. This timing may be necessary for the reasons pointed out in connection with the forced fourth speed to third speed shift. During other phases of operation of the mechanism, such as a change from first forward speed ratio to reverse or vice versa, chamber 67 can be quickly exhausted so that spring action can promptly be utilized for applying the brake band associated with the rear servo. In first speed ratio and reverse, line 101 is exhausted, permitting spring 100 to move valve 98 to the position shown, allowing oil to pass through line 96 either into or out of chamber 67. Thus oil in chamber 67 is not compelled to be exhausted through restriction 92.

When the mechanism is operated in reverse gear the front band must be applied and, at this time, there will be substantially no liquid under governor regulation and, consequently, the band will be applied by the presence of liquid under pressure in the lower part of chamber 11 introduced from the supply line 47 via valve 46 and line 45; and the only pressure occurring in chamber 12 will be that of liquid under compensator pressure, as described earlier.

From the foregoing it will be seen that the present invention provides controls for servo mechanisms of such character as to insure smooth shifting of the parts throughout the entire range of operation of the mechanism. The invention is not to be limited to the illustrated embodiment but is to be limited only by the scope of the following claims.

What is claimed is:

1. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid to act on a first of said pistons in opposition to said spring means, a control valve in said liquid line for controlling flow of liquid therethrough, a restricted by-pass for said liquid line around said control valve, means for introducing liquid under variable pressure to close said control valve, and means including a second valve for introducing liquid under variable pressure to hold said control valve open during predetermined operating conditions of said transmission.

2. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid to act on a first of said pistons in opposition to said spring means, a control valve in said liquid line for controlling flow of liquid therethrough, a restricted by-pass for said liquid line around said control valve, means for introducing liquid under variable pressure to close said control valve, and means including a second valve for introducing liquid under variable pressure to hold said control valve open during predetermined operating conditions of said transmission, said by-pass constituting the only path of travel of liquid to said first piston to act on it in opposition to said spring means when said control valve is closed.

3. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid to act on a first of said pistons in opposition to said spring means, a control valve in said liquid line for controlling flow of liquid therethrough, flow of liquid through said control valve applying a force to hold said control valve open, a restricted by-pass for said liquid line around said control valve, means for introducing liquid under variable pressure to close said control valve, and means including a second valve for introducing liquid under variable pressure to hold said control valve open during predetermined operating conditions of said transmission.

4. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid to act on a first of said pistons in opposition to said spring means, a control valve in said liquid line for controlling flow of liquid therethrough, flow of liquid through said control valve applying a force to hold said control valve open, a restricted by-pass for said liquid line around said control valve, means for introducing liquid under variable pressure to close said control valve, and means including a second valve for introducing liquid under variable pressure to hold said control valve open during predetermined operating conditions of said transmission, said by-pass constituting the only path of travel of liquid to said first piston to act on it in opposition to said spring means when said control valve is closed.

5. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid under controlled pressure to act on a first of said pistons in opposition to said spring means, a control valve in said liquid line for controlling flow of liquid therethrough, said liquid under controlled pressure acting to hold said control valve open, a restricted by-pass for said liquid line around said control valve, means for introducing liquid under variable pressure to close said control valve, and means including a second valve for introducing liquid under variable pressure to aid said liquid under controlled pressure in holding said control valve open during predetermined operating conditions of said transmission.

6. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid under controlled pressure to act on a first of said pistons in opposition to said spring means, a control valve in said liquid line for controlling flow of liquid therethrough, said liquid under controlled pressure acting to hold said control valve open, a restricted by-pass for said liquid line around said control valve, means for introducing liquid under variable pressure to close said control valve, and means including a second valve for introducing liquid under variable pressure to aid said liquid under controlled pressure in holding said control valve open during predetermined operating conditions of said transmission, said restricted by-pass constituting the only path of travel of liquid to said first piston to act on it in opposition to said spring means when said control valve is closed whereby movement of said piston in opposition to said spring means is retarded.

7. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid under controlled pressure to act on a first of said pistons in opposition to said spring means, a control valve in said liquid line for controlling flow of liquid therethrough, said liquid under controlled pressure acting on a first area of said control valve to hold it open, a restricted by-pass for said liquid line around said control valve, means for introducing liquid under variable pressure to a second larger area of said control valve to close it, and means including a second valve for introducing liquid under variable pressure to a third area of said control valve to aid said liquid under controlled pressure in holding said control valve open during predetermined operating conditions of said transmission.

8. In a hydraulically operated automatic transmission having a plurality of operating conditions, a servo device comprising a casing having a plurality of chambers, pistons slidable in said chambers, a piston rod secured to said pistons and having an end part extending beyond one end of said casing, spring means biasing said pistons and said rod in one direction, means for supplying liquid to said chambers to cause selected movement of said pistons, said last mentioned means including one of said chambers being connected to a liquid line for introducing liquid under controlled pressure to act on a first of said pistons in opposition to said spring means, a control valve in said liquid line for controlling flow of liquid therethrough, said liquid under controlled pressure acting on a first area of said control valve to hold it open, a restricted by-pass for said liquid line around said control valve, means for introducing liquid under variable pressure to a second larger area of said control valve to close it, and means including a second valve for introducing liquid under variable pressure to a third area of said control valve to aid said liquid under controlled pressure in holding said control valve open during predetermined operating conditions of said transmission, said restricted by-pass constituting the only path of travel of liquid to said first piston to act on it in opposition to said spring means when said control valve is closed whereby movement of said piston in opposition to said spring means is retarded.

9. In a hydraulically operated automatic transmission, a first servo device having a reciprocable piston therein, a second servo device having a reciprocable piston therein, a line for introducing liquid into said first servo device to act on the piston thereof to move it in one direction, a valve in said line for controlling the passage of liquid therethrough, a restricted bypass for said line around said valve, means for introducing liquid under variable pressure to close said valve, and means controlled by said second servo for introducing liquid under variable pressure to hold said valve open while the piston of said second servo is in one position thereof.

10. In a hydraulically operated automatic transmission, a first servo device having a piston reciprocable therein, a second servo device having a piston reciprocable therein, a line for introducing liquid into said first servo device to act on the piston thereof to move it in one direction, a valve in said line for controlling the passage of liquid therethrough, a restricted bypass for said line around said valve, means for introducing liquid under variable pressure to close said valve, and means controlled by said second servo for introducing liquid under variable pressure to hold said valve open while the piston of said second servo is in one position and for arresting said last mentioned liquid under variable pressure and exhausting that previously supplied to said valve when the piston of said second servo is in a second position.

11. In a hydraulically operated automatic transmission, a first servo device having a piston reciprocable therein, a second servo device having a piston reciprocable therein, the piston of said second servo being moved to one extreme position by spring means, a line for introducing liquid under variable pressure to said second servo to act on the piston thereof in aid of said spring, a line for introducing liquid into said first servo device to act on the piston thereof to move it in one direction, a control valve in said last mentioned line for controlling the passage of liquid therethrough, a restricted bypass for said line around said control valve, means for introducing liquid under variable pressure to close said control valve, and means having a second valve controlled by said second servo for conducting the said liquid under variable pressure introduced into said second servo to said control valve to hold said control valve open while the piston of said second servo is in a spring urged position.

12. In a hydraulically operated automatic transmission, a first servo device having a piston reciprocable therein, a second servo device having a piston reciprocable therein, a line for introducing liquid under controlled pressure into said first servo device to act on the piston thereof to move it in one direction, a control valve in said line for controlling the passage of liquid therethrough, a restricted bypass for said line around said control valve, constituting the only path of travel for said liquid under controlled pressure when said control valve is closed, means for introducing liquid under variable pressure to close said control valve, and means including a second valve control by said second servo for introducing liquid under variable pressure to hold said control valve open while the piston of said second servo is in one position, said last mentioned means arresting supply of liquid controlled thereby when the piston of the said second servo is in another position.

13. In a hydraulically operated automatic transmission, a first servo device having a piston reciprocable therein, a second servo device having a piston reciprocable therein and spring urged to one position, a line for introducing liquid into said first servo device to act on the piston thereof to move it in one direction, a control valve in said line for controlling the passage of liquid therethrough, a restricted bypass for said line around said control valve, means for introducing liquid under variable pressure to close said control valve, a line for conducting liquid under variable pressure to said second servo to act on the piston thereof for augmenting the spring force applied thereto, a control valve supply line from said second servo to said control valve and means in said second servo for connecting said control valve supply line to said servo for conducting said liquid under variable pressure from said second servo to said control valve to hold said control valve open while the piston of said second servo is in a position determined by said spring force thereon and the force of the liquid under variable pressure augmenting the spring force.

14. In a hydraulically operated automatic transmission, a first servo device having a piston reciprocable therein, a second servo device having a piston reciprocable therein and spring urged to one position, a line for introducing liquid into said first servo device to act on the piston thereof to move it in one direction, a control valve in said line for controlling the passage of liquid therethrough, a restricted bypass for said line around said control valve, means for introducing liquid under variable pressure to close said control valve, a line for conducting liquid under variable pressure to said second servo to act on the piston thereof for augmenting the spring force applied thereto, a control valve supply line from said second servo to said control valve and means in said second servo for connecting said control valve supply line to said servo for conducting said liquid under variable pressure from said second servo to said control valve to hold said control valve open while the piston of said second servo is in a position determined by said spring force thereon and the force of the liquid under variable pressure augmenting the spring force and for disconnecting said control valve supply line from said second servo when the piston of said second servo is in another position.

References Cited in the file of this patent

UNITED STATES PATENTS

| | | |
|---|---|---|
| 2,204,872 | Thompson | June 18, 1940 |
| 2,221,393 | Carnegie | Nov. 12, 1940 |
| 2,630,895 | McFarland | Mar. 10, 1953 |
| 2,640,373 | Jandasek | June 2, 1953 |